UNITED STATES PATENT OFFICE.

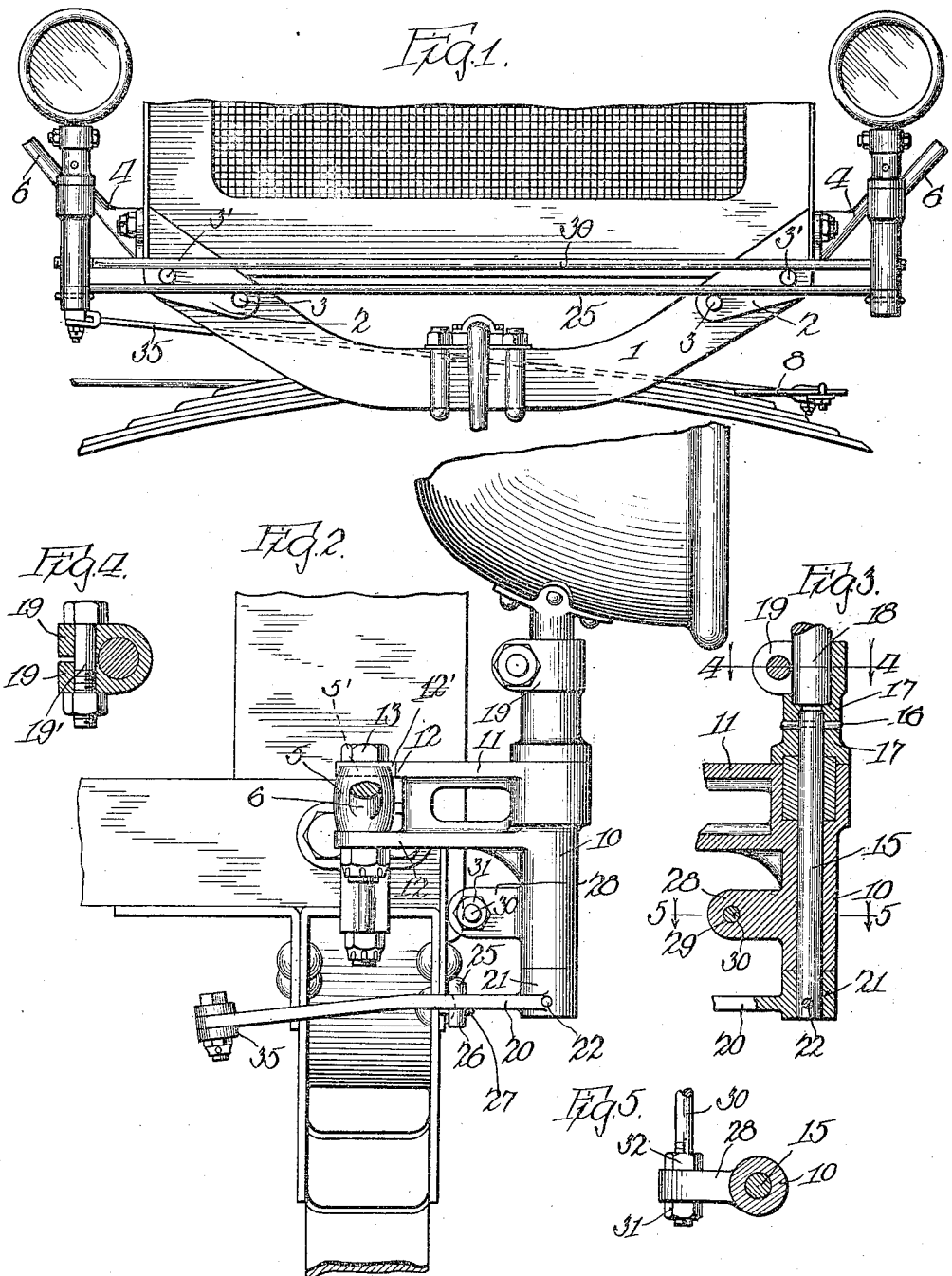

JOSEPH H. TAUSCH, OF WAUKEGAN, ILLINOIS, ASSIGNOR TO PETTIS F. BROWN, OF LUBBOCK, TEXAS.

AUTOMOBILE-HEADLIGHT.

1,278,519.      Specification of Letters Patent.     Patented Sept. 10, 1918.

Application filed May 3, 1918. Serial No. 232,327.

*To all whom it may concern:*

Be it known that I, JOSEPH H. TAUSCH, a citizen of the United States, residing at the city of Waukegan, in the county of Lake and State of Illinois, have invented certain new and useful Improvements in Automobile-Headlights, of which the following is a specification.

My invention relates to automobiles and especially to the headlights thereof, and it is designed to provide means by which such headlights may be caused automatically to turn in conformity with the direction of the front wheels of the automobile, so that the illumination may at all times conform to the direction of the vehicle. It is especially devised to take advantage of certain details of construction of a well-known and highly standardized motor vehicle, and to produce higher efficiency and add greater convenience to the operation thereof. In taking advantage of such special construction I am able to produce a very simple and inexpensive device, and one which is durable and practically secure against disarrangement of the parts.

The principles of my invention are illustrated in the drawings, in which—

Figure 1 is a front view of a portion of the frame of the vehicle above referred to, having my improved lamp actuating device attached thereto;

Fig. 2 is a side view of the same looked at from the left;

Fig. 3 is a vertical section of a portion of the device shown in Fig. 2;

Fig. 4 is a cross section on line 4 of Fig. 3;

Fig. 5 is a cross section on line 5—5 of Fig. 3.

Further describing my invention with reference to the drawings, 1 represents the front cross bar of the chassis frame. 2—2 are corner braces by which, by means of rivets 3, 3' the said cross bar is secured to the longitudinal bars of the frame. 4—4 are brackets of the construction standard on the said machine to support the lamps as ordinarily provided for and used thereon. Such brackets have the tubular body part 5, which should be notched at 5' in the upper end and have extensions 6 which are shown cut away and by which the fenders are supported. 8 is the connecting rod by which the two steering knuckles (not shown) are connected.

My invention is designed with reference to and to be used in combination with the mechanisms above described. It includes, among other things, an extension or supplemental lamp bracket having a tubular body portion 10, from which is laterally extended an arm 11, having the spaced members 12, the upper one of which is formed at 12 to fit in the notches 5', and which are adapted to fit over and embrace the body 5 of bracket 4, and to be secured thereto by bolts 13, which pass through the opening in said body originally intended to take the stem of the lamp carrier and clamp the spaced members on said body. A shaft 15 is extended upwardly through the shaft opening in 10, and secured to the upper end thereof, by a rivet 16 or other means, is a head 17. Said head is provided with a longitudinal bore corresponding in size to that in the body bracket 4 adapted to receive the stem 18 of the device by which the lamp is carried, and which originally fitted the opening in bracket 4. Said head is further provided with a clamp, illustrated in Fig. 4, comprising the leaves 19 and binding screw 19' by which the lamp stem 18 may be secured in place in the head. A lever 20 is attached at 21 to the shaft 15 by a rivet 22 or other suitable means. This same construction as described is applied to both of the extension brackets and to the levers extended backwardly therefrom, with the exception that one lever on the right side of the car is longer than that on the left side thereof. The said two levers are connected by means of a rod 25, having downturned ends 26, which are passed through suitable openings in the said levers and secured thereto by cotter pins 27. Said lever connecting rod 25 may be slightly curved or bowed backwardly to give a spring pressure against the plates 2 and it passes between the rivets 3 and 3' in such a way that said rivets act as guides therefor. The body portions of the supplemental brackets are provided with off-set ears 28, having openings 29 through which are passed the ends of the brace rod 30, provided at each end with nuts 31 and 32. Between the said nuts such ears are securely held, and the said extension brackets are supported in rigid relation to each other. To the end of lever 20, on the right hand side of the car, is attached a connecting rod 35, which is extended across the car, preferably to the left side thereof, and attached to the knuckle arm or to the connecting rod 8 by which the two steering knuckles are held in operative relation.

I claim:

1. In a motor car having a knuckle connecting rod and laterally extended lamp brackets; the combination therewith of extension lamp brackets having tubular body portions, means for securing the said extension brackets to the primary brackets, ears off-set from the body portions of said secondary brackets, a brace rod to connect the two ears, shafts in the body portions of said secondary brackets having lamp holding heads on the upper ends and off-set levers on the lower ends thereof, a rod to connect said levers, and means for operatively connecting one of said levers to the knuckle connecting rod.

2. In a motor car having a knuckle connecting rod and lamp brackets laterally extended and having body portions provided with lamp stem openings and retaining grooves, extension brackets comprising body portions and arms each having spaced members to embrace the said brackets, and one of the members on each arm being formed to seat in a corresponding retaining groove; a bolt passed through said spaced members and lamp stem openings to secure the extension brackets to the primary brackets, ears off-set from the body portions of the secondary brackets, a brace rod to connect said ears, shafts in the body portions to said secondary brackets having lamp holding heads on the upper ends and off-set levers on the lower ends thereof, a rod to connect said levers, and means for operatively connecting one of said levers to the knuckle connecting rod.

3. In a motor car having a knuckle connecting rod and lamp brackets laterally extended and having body portions provided with lamp stem openings, extension brackets comprising body portions and arms each having spaced members to embrace the said brackets, a bolt passed through said spaced members and lamp stem openings to secure the extension brackets to the primary brackets, ears off-set from the body portions of the secondary brackets, a brace rod to connect said ears, shafts in the body portions of said secondary brackets having lamp holding heads on the upper ends and off-set levers on the lower ends thereof, a rod to connect said levers, and means for operatively connecting one of said levers to the knuckle connecting rod.

4. In a motor car having a knuckle connecting rod forwardly projecting rivet heads on the front of the chassis frame, and laterally extended lamp brackets; the combination therewith of extension lamp brackets attached to the primary lamp brackets and each comprising a body portion and laterally extended ears, a brace extended from one of said ears to the other ear, shafts in the body portions of the extension brackets, lamp supporting heads on said shafts, levers on said shafts, a rod to connect said levers longitudinally slidable between said rivet heads, and means for operatively connecting one of said levers to the knuckle connecting rod.

5. In a motor car having a knuckle connecting rod, forwardly extending projections on the front of the chassis frame and laterally extended lamp brackets; the combination therewith of extension lamp brackets attached to the primary lamp brackets and each comprising a body portion and laterally extended ears, a brace extended from one of said ears to the other ear, shafts in the body portions of the extension brackets, lamp supporting heads on said shafts, levers on said shafts, a rod to connect said levers longitudinally slidable between said forwardly extended projections, and means for operatively connecting one of said levers to the knuckle connecting rod.

JOSEPH H. TAUSCH.

Copies of this patent may be obtained for five cents each, by addressing the "Commissioner of Patents, Washington, D. C."